United States Patent
Anshel et al.

(10) Patent No.: US 11,245,516 B2
(45) Date of Patent: Feb. 8, 2022

(54) SHARED SECRET DATA PRODUCTION WITH USE OF CONCEALED CLOAKING ELEMENTS

(71) Applicant: VERIDIFY SECURITY INC., Shelton, CT (US)

(72) Inventors: Iris Anshel, Shelton, CT (US); Dorian Goldfeld, Shelton, CT (US)

(73) Assignee: VERIDIFY SECURITY INC., Shelton, CT (US)

( * ) Notice: Subject to any disclaimer, the term of this patent is extended or adjusted under 35 U.S.C. 154(b) by 116 days.

(21) Appl. No.: 16/841,756

(22) Filed: Apr. 7, 2020

(65) Prior Publication Data

US 2020/0344050 A1 Oct. 29, 2020

Related U.S. Application Data

(60) Provisional application No. 62/837,893, filed on Apr. 24, 2019.

(51) Int. Cl.
| | |
|---|---|
| *G06F 21/00* | (2013.01) |
| *H04L 29/06* | (2006.01) |
| *H04L 9/08* | (2006.01) |
| *H04L 9/06* | (2006.01) |
| *H04L 9/00* | (2006.01) |

(52) U.S. Cl.
CPC ............ *H04L 9/0825* (2013.01); *H04L 9/008* (2013.01); *H04L 9/0643* (2013.01); *H04L 9/0662* (2013.01); *H04L 9/0869* (2013.01)

(58) Field of Classification Search
CPC ... H04L 9/0825; H04L 9/0869; H04L 9/0643; H04L 9/0662; H04L 9/008; H04L 9/30; H04L 9/0838
See application file for complete search history.

(56) References Cited

U.S. PATENT DOCUMENTS

| | | | |
|---|---|---|---|
| 2019/0207757 A1* | 7/2019 | Hennebert | H04L 9/0861 |
| 2021/0044437 A1* | 2/2021 | Davis | H04L 9/0841 |

* cited by examiner

*Primary Examiner* — Lisa C Lewis
(74) *Attorney, Agent, or Firm* — DLA Piper LLP US (57) ABSTRACT

Systems and methods to produce shared secret data are generally described. In some examples, a first device may receive a first public key from a second device. The first device may produce a first public key based on the first public key of the second device. The respective private keys of each device may be associated with the first public keys of each device. Each device may produce a second public key based of respective private keys and the other devices first public key. Each device may transmit a second public key to the other device. The first device may produce the shared secret data based on its private key and the second public key of the second device. The second device may produce the shared secret data based on its private key and the second public key of the first device.

20 Claims, 5 Drawing Sheets

SHARED SECRET DATA PRODUCTION WITH USE OF CONCEALED CLOAKING ELEMENTS

CROSS-REFERENCE TO RELATED APPLICATION

This application claims the benefit of priority from U.S. Provisional Application No. 62/837,893, filed Apr. 24, 2019, the entirety of which is incorporated by reference herein.

BRIEF DESCRIPTION OF THE FIGURES

The features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION OF THE PREFERRED EMBODIMENT(S)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
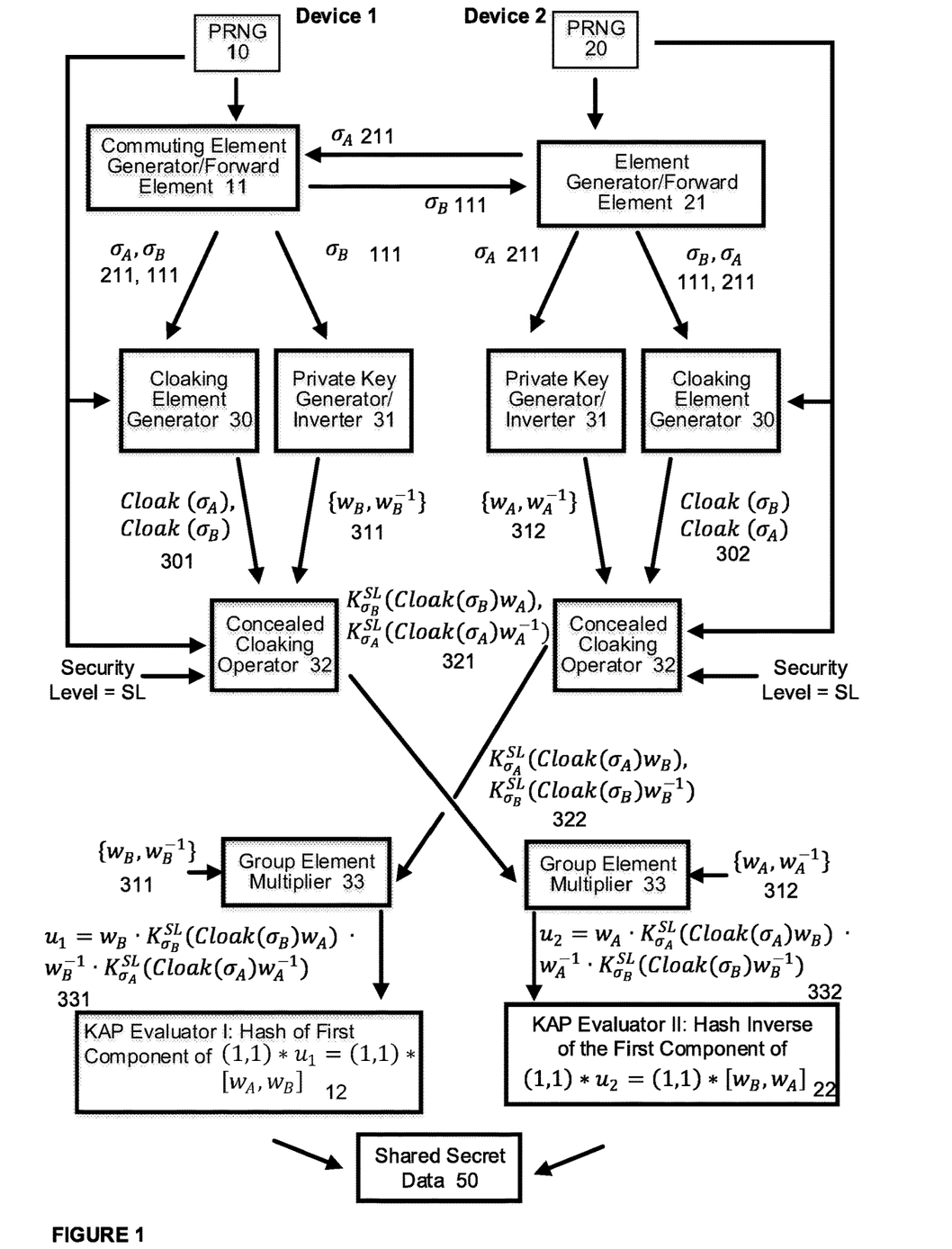
FIG. 1 illustrates an example process that can be utilized to implement a shared secret data production system.

FIG. 1 illustrates an example process that can be utilized to implement a shared secret data production system, arranged in accordance with at least some embodiments described herein. The process may include at least a device 1 and/or a device 2. In some examples, devices 1, 2 may each be a computing device such as a personal computer, a laptop computer, a mobile device, a cellular phone, a tablet computer, a wearable device, a radio frequency transmitter or receiver, etc. Device 1 and device 2 may be configured to be in communication with each other through a network. A network may be a wireless network, a wired network, the internet, a cellular network, a near field communication (NFC) network, a radio frequency identification (RFID) network, a cloud computing environment, etc. In some examples, device 1 and device 2 may communicate with each other through a link, which may be an open communication channel within a network. In some examples, device 1 and device 2 may each be controlled by the respective users.

As will be described in more detail below, device 2 may forward output from a pseudorandom number PRNG 20 to an element generator/forward element 21 to produce a first public key 211. For example, element generator/forward element 21 may take the output of pseudorandom number generator PRNG 20 and may choose a pseudorandom element in a group which is part of the data that specifies an algebraic eraser, as described below. This pseudorandom element may be a first public key 211 of device 2. Device 2 may send the first public key 211 to device 1 through a link. Device 1 may forward output from a pseudorandom number generator PRNG 10 along with the first public key 211 to a commuting element generator/forward element 11 to generate an element 111. Commuting element generator/forward element 11 may take the output of pseudorandom number generator PRNG 10 together with the received first public key of device 2 and may choose a pseudorandom element (e.g., selected based on the output of pseudorandom number generator PRNG 10) in a subgroup of the group which is part of the data that specifies the algebraic eraser. The subgroup may include elements which commute with the received public key 211. This pseudorandom element may be a first public key 111 of device 1. Device 1 may send element 111 to device 2 over a link. Device 2 may send first public key 211 to a private key generator/inverter 31, which may produce an element and its inverse 312. The data that specifies the algebraic eraser may include a homomorphism from a group to the group that contains the first public key 211. The private key generator/inverter 31 may generate the private key for device 2 by first finding an inverse image of the first public key 211 under the homomorphism, and then taking the inverse of said inverse image. This pair 312 may be a private key for device 2. Device 2 may send the received first public key 111, its own first public key 211, and output from PRNG 20 to a cloaking element generator 30, which may produce cloaking elements 302 for the element 111 and 211.

Concurrently, device 1 may send first public key 111 to a private key generator/inverter 31, which may produce an element and its inverse 311. This pair 311 may be a private key for device 1. Device 1 may send the received first public key 211, its own first public key 111, and output from PRNG 10 to a cloaking element generator 30, which may produce cloaking elements 301 for the elements 211 and 111. Cloaking elements 301 and 302 may be elements of a group which may be a component of the data that specifies the algebraic eraser. Cloaking elements 301 and 302 may have the property that they stabilize received public keys under an action which may be a component of the data that specifies the algebraic eraser. An element may act as a stabilizer provided that certain equations are satisfied, as described in detail below. Device 2 may forward the private key 312 together with cloaking elements 302 to a concealed cloaking operator 32. A concealed cloaking operator 32 may receive additional input from pseudorandom number generator PRNG 20, and a security level SL inherent to the system, to produce a second public key 321 of device 2. A protocol or algorithm may have security level SL when reversing the protocol or algorithm would require at least $2^{SL}$ operations. The second public key 321 may be produced from the cloaking element 302 and the private key 312 by forwarding the group elements to a concealing cloaking operator 32 along with the security level SL and the output from PRNG 20. The concealing cloaking operator 32 may use the output from PRNG 20 and the security level SL to produce and insert sufficiently many concealing cloaking elements that any attempt to reverse engineer the process would require at least $2^{SL}$ operations. In cases where a concealed cloaking operator 32 is utilized, the concealed cloaking operator 32 may execute a rewriting instruction (described below), and said rewriting instruction may obscure the structure of an element in such a way that it may difficult, perhaps infeasible, to obtain the structure of the element before the rewriting instruction was applied. The concealed cloaking operator 32 may produce a pair of elements 321, which may enable device 1 to evaluate shared secret data. Device 2 may send the pair of elements 321 to device 1 through a link.

Concurrently, device 1 may forward the private key 311 together with cloaking elements 301 to a concealed cloaking operator 32. A concealed cloaking operator 32 may receive additional input from pseudorandom number generator PRNG 10, and a security level SL inherent to the system, to produce a second public key 322 key of device 1. The concealed cloaking operator 32 may produce a pair of elements 322, which may enable device 2 to evaluate shared secret data. Device 1 may send the pair of elements 322 to device 1 through a link. Device 2 may forward the pairs 322 and 312 to a group element multiplier 33, which may produce the element 332.

Concurrently, device 1 may forward the pairs 321 and 311 to a group element multiplier 33, which may produce the element 331. Device 2 may produce the shared secret data by forwarding the output 332 to the KAP evaluator II 22, which may execute E-multiplication on the element 332 using an algebraic eraser module, produce the inverse of the first component of the output of said E-multiplication, and may then apply a cryptographic hash function on said first component. The respective key agreement evaluators, KAP evaluator I and KAP evaluator II, may begin by forming the commutator of a private key and a received second public key. KAP evaluator I may execute the operation E-multiplication of the resulting commutator on a specified fixed element, and then may apply a cryptographic hash function to the first component of the output of the E-multiplication. KAP evaluator II may execute the operation E-multiplication of the resulting commutator on a specified fixed element, may evaluate the inverse of the first component of the output of said E-multiplication, and then may apply a cryptographic hash function to said inverse, as described in detail below. Device 2 may obtain the shared secret data as the output of 22. Concurrently, device 1 may produce the shared secret data by forwarding the output 331 to the KAP evaluator I 12, which may execute E-multiplication on the element 331 using an algebraic eraser module, and may then apply a cryptographic hash function on the first component of the output of said E-multiplication. Device 1 may obtain the shared secret data as the output of 12.

Device 1 may include a processor and/or a memory, where processor and memory may be configured to be in communication with each other. Device 1 may further include one or more modules configured to perform operations related to an implementation of system. Each module of device 1 may be a piece of hardware component such as a microprocessor, microcontroller, arithmetic logic unit, programmable circuit such as field programmable logic array, system on chip, etc. For example, device 1 may further include an algebraic eraser module, where algebraic eraser module may include an algebraic eraser instruction. The algebraic eraser module and instruction may provide a component or protocol that may evaluate the one-way function E-multiplication as specified below. The function E-multiplication may be assumed to satisfy the E-function identity/equation given below. The function E-multiplication may be viewed as a group action when defining cloaking elements. In some examples, the processor may control operations of algebraic eraser module. The memory may be configured to store received public keys 211, 321, and a concealed cloaking operator 32 may use said public keys, and a rewriting instruction (described below) effective to facilitate production of the output of a concealed cloaking operator 32. Memory may be further configured to store a private key.

Device 2 may include a processor and/or a memory, where processor and memory may be configured to be in communication with each other. Device 2 may further include one or more modules configured to perform operations related to an implementation of system. Each module of device 1 may be a piece of hardware component such as a microprocessor, microcontroller, arithmetic logic unit, programmable circuit such as field programmable logic array, system on chip, etc. For example, device 2 may further include an algebraic eraser module, where algebraic eraser module may include an algebraic eraser instruction. In some examples, the processor may control operations of algebraic eraser module. The memory may be configured to store received public keys 111, 321, and where a concealed cloaking operator 32 may use a rewriting instruction (described below) effective to facilitate production of the output of a concealed cloaking operator 32. Memory may be further configured to store a private key.

In some examples, an algebraic eraser module may evaluate the algebraic eraser to facilitate the production of shared secret data. An algebraic eraser may include instructions relating to a one-way function that is computable but difficult, perhaps infeasible, to reverse. In an example, an instance of a one-way function based may utilize a specified 6-tuple $(M \ltimes S, N, \Pi, E, A, B)$ where:

Groups M and N, where M and N are monoids,
S is a group that acts on M (on the left),
$M \ltimes S$ denotes the semi-direct product,
Subgroups A and B, where A and B denote E-commuting submonoids of $M \ltimes S$, and
$\Pi$ denotes a one-way homomorphism from M to N, where $\Pi$ enables the one-way function E-function, also called E-multiplication. The E-function is a right action of the semi-direct product $M \ltimes S$ on the direct product $N \times S$:

$$E: (N \times S) \times (M \ltimes S) \to (N \times S) E((n,s),(m_1,s_1)) = (n\Pi(^s m_1), s s_1).$$

It is observed that the E-function satisfies the following identity:

$$E((n,s),((m_1,s_1)\cdot(m_2,s_2))) = E(E((n,s),(m_1,s_1)),(m_2,s_2)).$$

In some examples, a cloaking element generator 30 may produce stabilizing elements of the above action, which may be forwarded to the concealed cloaking operator 32. It may be difficult, perhaps infeasible, for one to recover the private key of either device from the output of the concealed cloaking operator 32. In an example, the concealed cloaking operator 32 may be based on the specified 6-tuple $(M \ltimes S, N, \Pi, E, A, B)$ and using the following data:

A group G, associated with an obscuring rewriting instruction denoted $\mathcal{R}$, where $\mathcal{R}$ may be the rewriting instruction,
A homomorphism $\varphi: G \to M \ltimes S$. For $g \in G$, where $\varphi(g) = (M_g, s_g)$, and a projection function $g \to s_g$ that may be a homomorphism, When there is an element $s \in S$, which may be a second entry of an element of $M \bowtie S$, a cloaking element generator 30 may be executed to produce an element that stabilizes an element $(1, s) \in M \bowtie S$ based on a specified right action above, i.e., construction of an element $(v, id) \in M \bowtie S$, which satisfies the property:

$$(1,s)*(v,id)=(1,s)$$

By executing concealed cloaking operator 32 on the output of the private key generator/inverter 311 and the output of the cloaking element generator 301, device 1 may generate elements 331. Similarly, device 2 may generate elements 332.

The concealed cloaking operator 32 may take an element and insert, at random points within said element, a cloaking element for the element $s \in S$ associated with the initial subword up to that random point. The output of E-multiplication of the concealed cloaking operator 32 with a pre-specified element of S may be the same as the output of E-multiplication with the original element and said pre-specified element of S.

As a result of exchanging the respective outputs of the concealed cloaking operator 32, 321, 322, device 1 and device 2 may each apply respectively KAP evaluator I 12 and KAP evaluator II 22, to produce shared secret data. Device 1 may produce shared secret data 50 based on private key 311 and a second public key 322 of device 2. The shared secret data may be evaluated as follows:

$$\text{Hash}[\text{First Component}[(1,1)*w_B \cdot \kappa_{\sigma_B}^{SL}(\text{Cloak}(\sigma_B)w_A) \cdot w_B^{-1} \cdot \kappa_{\sigma_A}^{SL}(\text{Cloak}(\sigma_A)w_A^{-1})]].$$

Similarly, device 2 may produce shared secret data based on private key 312 and a second public key 321 of device 1. The shared secret data 50 may be evaluated as follows:

$$\text{Hash}[\text{First Component}[(1,1)*w_A \cdot \kappa_{\sigma_A}^{SL}(\text{Cloak}(\sigma_A)w_B) \cdot w_A^{-1} \cdot \kappa_{\sigma_B}^{SL}(\text{Cloak}(\sigma_{AB})w_B^{-1})]^{-1}].$$

By using a system in accordance with this disclosure, a first device and a second device may produce a same secret data based on an exchange of first and second public keys, where the concealed cloaking operator 32 may be effective to hide respective private keys from devices outside of the first and second devices. It may be impossible for another device to retrieve the private keys even when the public keys are being exchanged in an open communication channel. By exchanging public keys, the first and second devices may each recover shared secret data 50.

Figure 2:
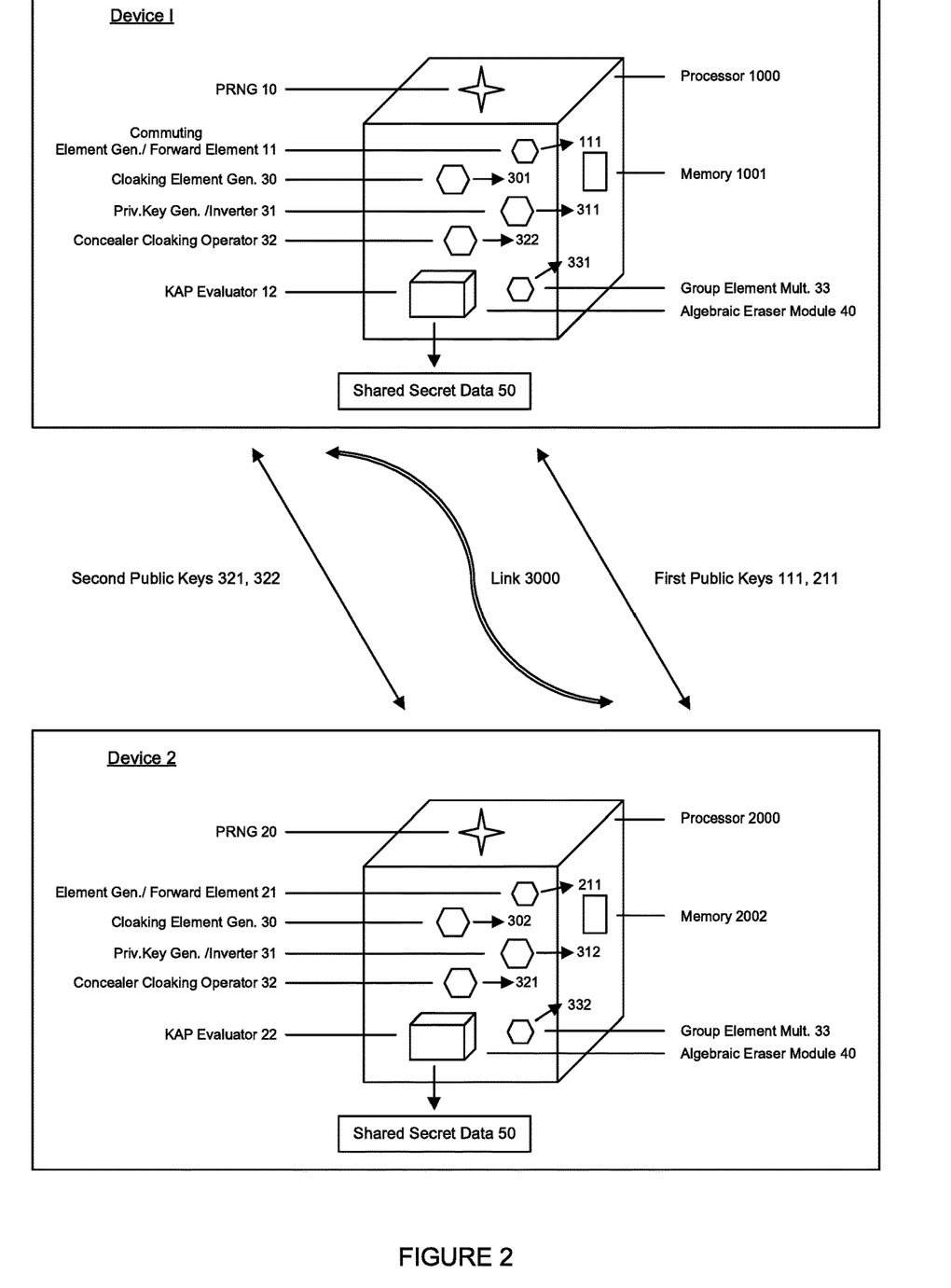
FIG. 2 illustrates an example system that can be utilized to implement a shared secret data production system.

FIG. 2 illustrates an example system that may be utilized to implement a shared secret data production system, arranged in accordance with at least some embodiments described herein. The process in FIG. 1 could be implemented using, for example, the system of FIG. 2. In some cases, components in FIG. 2 that are labelled identically to components of FIG. 1 may be described again for the purposes of clarity.

As shown in FIG. 2 the system may include at least a device 1 and/or a device 2. In some examples, devices 1, 2 may each be a computing device such as a personal computer, a laptop computer, a mobile device, a cellular phone, a tablet computer, a wearable device, a radio frequency transmitter or receiver, etc. Device 1 and device 2 may be configured to be in communication with each other through a network. A network may be a wireless network, a wired network, the internet, a cellular network, a near field communication (NFC) network, a radio frequency identification (RFID) network, a cloud computing environment, etc. In some examples, device 1 and device 2 may communicate with each other through link 3000, which may be an open communication channel within a network. In some examples, device 1 and device 2, may each be controlled by respective users.

Device 2 may forward the output of a pseudorandom number generator 20 (PRNG 20) to and element generator/forward element 21. The output of the element generator/forward element 21, 211, may be the first public key of device 2. Device 2 may send said first public key 211 to device 1 through a link 3000. Device 1 may forward the output of a pseudorandom number generator 10 (PRNG 10), along with the received public key 211, to a commuting element generator/forward element 11, which may output an element 111 which may be a first public key of device 1. Device 1 may send said first public key 111 to device 2 through a link 3000.

Device 2 may forward both first public keys 111, 211 to a cloaking element generator 30, which may output cloaking elements 302. The cloaking element generator 30 may use system data, which may be saved in memory 2002. Device 2 may forward first public key 211 to private key generator/inverter 31, which may output a pair 312 consisting of an element and its inverse, which may be the private key of device 2. The pair 312, the cloaking elements 302, and output from PRNG 20, may be forwarded to a concealed cloaking operator 32. In addition, a security level, which may be saved in memory 2002, may be forwarded to concealed cloaking operator 32. Concealed cloaking operator 32 may use system data, which may be saved in memory 2002. The output of concealed cloaking operator 32, 321 may be the second public key of device 2, and device 2 may send said second public key 321 to device 1 over link 3000. In some examples, it may be difficult, perhaps infeasible, to determine private key 312 from the second public key 321.

Device 1 may forward both first public keys 111, 211 to a cloaking element generator 30, which may output cloaking elements 301. The cloaking element generator 30 may use system data, which may be saved in memory 1001. Device 1 may forward first public key 111 to private key generator/inverter 31, which may output a pair 311 consisting of an element and its inverse, which may be the private key of device 1. The pair 311, the cloaking elements 301, and output from PRNG 10, may be forwarded to a concealed cloaking operator 32. In addition, a security level, which may be saved in memory 1001, may be forwarded to concealed cloaking operator 32. Concealed cloaking operator 32 may use system data, which may be saved in memory 1001. The output of concealed cloaking operator 32, 322 may be the second public key of device 1, and device 1 may send said second public key 322 to device 2 over link 3000. In some examples, it may be difficult, perhaps infeasible, to determine private key 311 from the second public key 322.

Device 2 may forward the received second public key 322, along with private key 312, to group element multiplier 33. The output from group element multiplier 33, 332 may be forwarded to KAP evaluator II 22. KAP evaluator II 22 may evaluate E-multiplication of 332 with an element using an E-multiplication module 40. The E-multiplication module 40 may use system data, which may be saved in memory 2002. KAP evaluator II 22 may use system data, which may be saved in memory 2002, to apply a hash function to the inverse of the output of the E-multiplication module 40. The output of the hash function applied to the inverse of the output of E-multiplication module 40 may be the shared secret data 50. In some examples, shared secret data 50 may be inaccessible to devices different form device 1 and device 2.

Device 1 may forward the received second public key 321, along with private key 311, to group element multiplier 33. The output from group element multiplier 33, 331 may be forwarded to KAP evaluator I 12. KAP evaluator I 12 may evaluate E-multiplication of 331 with an element using an E-multiplication module 40. The E-multiplication module 40 may use system data, which may be saved in memory 1001. KAP evaluator I 12 may use system data, which may be saved in memory 1001, to apply a hash function to the output of the E-multiplication module 40. The output of the hash function applied to the output of E-multiplication module 40 may be the shared secret data 50. In some examples, shared secret data 50 may be inaccessible to devices different form device 1 and device 2.

Figure 3:
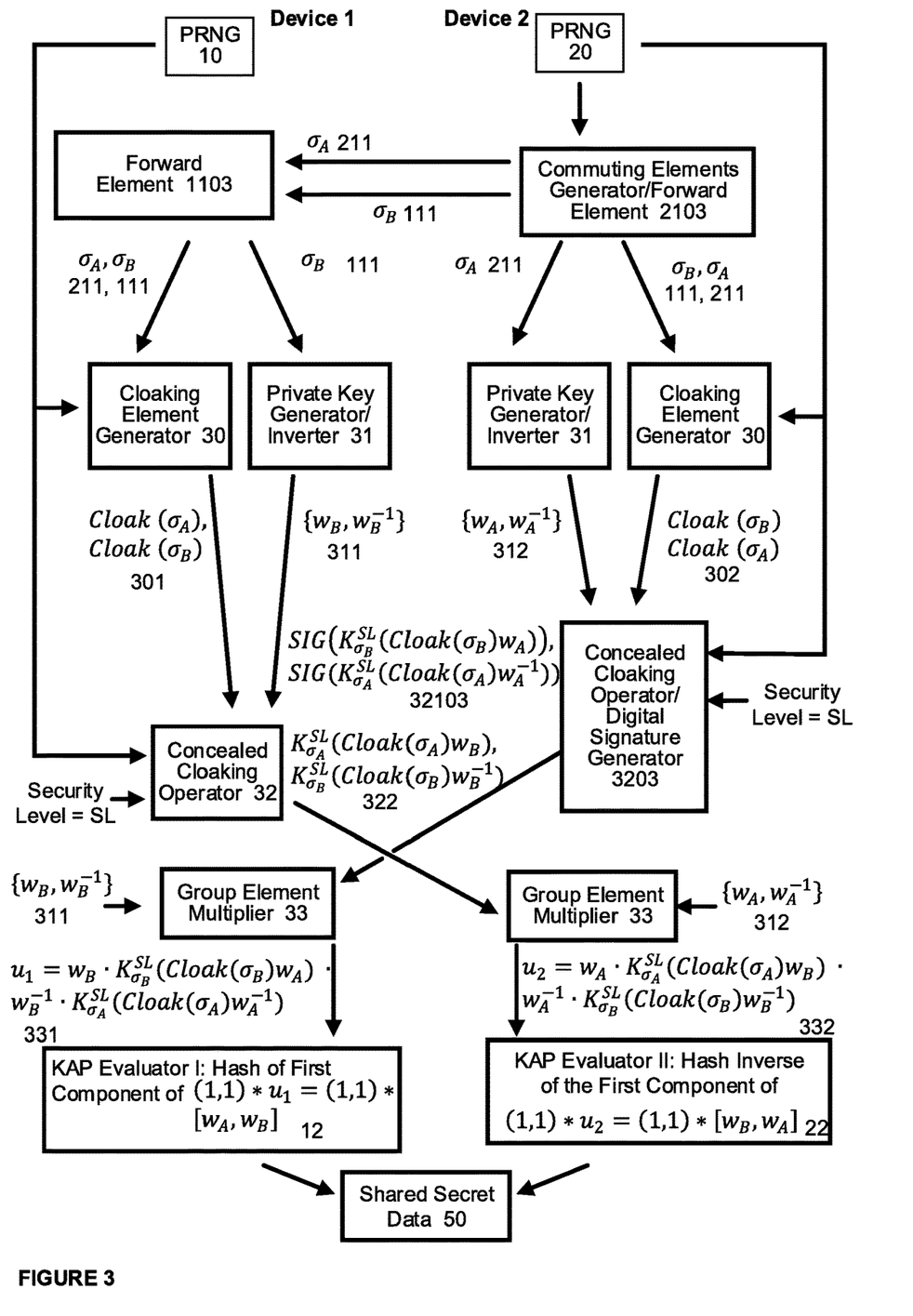
FIG. 3 illustrates a second example process that can be utilized to implement a shared secret data production system.

FIG. 3 illustrates an example process that can be utilized to implement a shared secret data production system, arranged in accordance with at least some embodiments described herein. The process may include at least a device 1 and/or a device 2 such as those specified in FIG. 1. As will be described in more detail below, device 2 may forward output from a pseudorandom number generator PRNG 20 to a commuting elements generator/forward element 2103 to produce two first public keys 211, 111. Device 2 may send elements 211 and 111 to device 1 through a link. The element 111 may be a first public key of device 1 and the element 211 may be a first public key of device 2. Device 2 may send first public key 211 to a private key generator/inverter 31, which may produce an element and its inverse 312. This pair 312 may be a private key for device 2. Device 2 may send the first public keys 111 and 211, and output from PRNG 20, to a cloaking element generator 30, which may produce cloaking elements 302 for the element 111 and 211.

Concurrently, device 1 may send first public key 111 to a private key generator/inverter 31, which may produce an element and its inverse 311. This pair 311 may be a private key for device 1. Device 1 may send the first public keys 111 and 211, and output from PRNG 10, to a cloaking element generator 30, which may produce cloaking elements 301 for the elements 211 and 111. Device 2 may forward the private key 312 together with cloaking elements 302 to a concealed cloaking operator/digital signature generator 3203. A concealed cloaking operator/digital signature generator 3203 may receive additional input from pseudorandom number generator PRNG 20, and a security level SL inherent to the system, to produce a second public key 2103 of device 2, and its associated digital signature. When a concealed cloaking operator/digital signature generator 3203 is utilized, the concealed cloaking operator/digital signature generator 3203 may execute a rewriting instruction (described above), and said rewriting instruction may obscure the structure of an element in such a way that it may difficult, perhaps infeasible, to obtain the structure of the element before the rewriting instruction was applied. The concealed cloaking operator/digital signature generator 3203 may produce a pair of elements and the associated digital signature. The concealed cloaking operator/digital signature generator 3203 may produce a pair of elements 2103, which may enable device 1 to evaluate the shared secret data. A component of the output of concealed cloaking operator/digital signature generator 3203, 2103, may be a pair of elements, which may be a second public key of device 2. Device 2 may send the output of concealed cloaking operator/digital signature generator 3203, which may be a pair of elements and its associated digital signature, to device 1 through a link.

Concurrently, device 1 may forward the private key 311 together with cloaking elements 301 to a concealed cloaking operator 32. A concealed cloaking operator 32 may receive additional input from pseudorandom number generator PRNG 20, and a security level SL inherent to the system, to produce a second public key 322 key of device 1. The concealed cloaking operator 32 may produce a pair of elements 322, which may enable device 2 to evaluate shared secret data. Device 1 may send the pair of elements 322 to device 2 through a link. Device 2 may forward the pairs 322 and 312 to a group element multiplier 33, which may produce the element 332.

Concurrently, device 1 may forward the digital signature component of the output of concealed cloaking operator/digital signature generator 3203, 2103 to a signature verifier 3303. The signature verifier 3303 may produce an output 333 that indicates whether the signature verifier 3303 has verified the digital signature of the component of 2103. If the output 333 indicates the signature has been verified, then device 1 may forward the pair of second public key component of 2103, which may include a pair of elements, and 311 to a group element multiplier 33, which may produce the element 331. Device 2 may produce the shared secret data by forwarding the output 332 to the KAP evaluator II 22, which may execute E-multiplication on the element 332 using an algebraic eraser module, produce the inverse of the first component of the output of said E-multiplication, and may then apply a cryptographic hash function on said first component. Device 2 may obtain the shared secret data as the output of 22.

Concurrently, device 1 may produce the shared secret data by forwarding the output 331 to the KAP evaluator I 12, which may execute E-multiplication on the element 331 using an algebraic eraser module, and may then apply a cryptographic hash function on the first component of the output of said E-multiplication. Device 1 may obtain the shared secret data as the output of 12.

Device 1 and device 2 specified in the process depicted in FIG. 3 may have the same properties and characteristics as those in the process described in FIG. 1. Redundant description is omitted.

Figure 4:
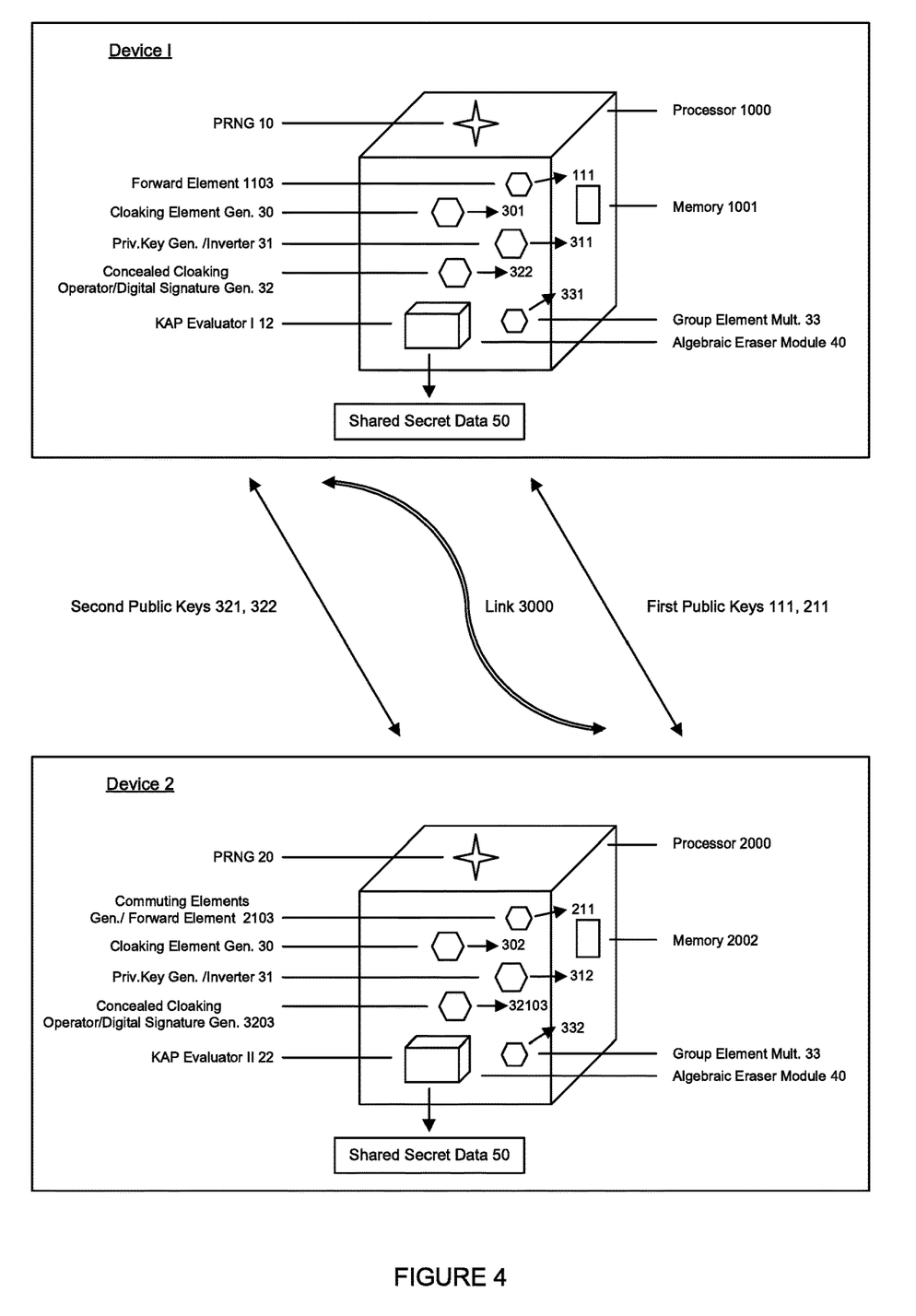
FIG. 4 illustrates a second example system that can be utilized to implement a shared secret data production system.

FIG. 4 illustrates an example system that may be utilized to implement a shared secret data production system, arranged in accordance with at least some embodiments described herein. The process in FIG. 3 could be implemented using, for example, the system of FIG. 4. In some cases, components in FIG. 4 that are labelled identically to components of FIG. 3 may be described again for the purposes of clarity. The system may include at least a device 1 and/or a device 2 as specified in FIG. 3.

Device 2 may forward the output of a pseudorandom number generator 20 (PRNG 20) to a commuting elements generator/forward element 2103. The output of the commuting elements generator/forward element 2103, 111, 211, may be the first public keys of device 1 and device 2, respectively. Device 2 may send said first public keys 111, 211 to device 1 through a link 3000.

Device 2 may forward both first public keys 111, 211 to a cloaking element generator 30, which may output cloaking elements 302. The cloaking element generator 30 may use system data, which may be saved in memory 2002. Device 2 may forward first public key 211 to private key generator/inverter 31, which may output a pair 312 consisting of an element and its inverse, which may be the private key of device 2. Device 2 may forward the private key 312 together with cloaking elements 302 to a concealed cloaking operator/digital signature generator 3203. A concealed cloaking operator/digital signature generator 3203 may receive additional input from pseudorandom number generator PRNG 20, and a security level SL inherent to the system, which may be saved in memory 2002, to produce a second public key 2103 of device 2, and its associated digital signature. The output of the concealed cloaking operator/digital signature generator 3203 may include a pair of elements and the associated digital signature. The concealed cloaking operator/digital signature generator 3203 output may include a pair of elements 2103, which may be the second public key of device 2, and which may enable device 1 to evaluate the shared secret data. Device 2 may send said second public key 2103 to device 1 over link 3000. In some examples, it may be difficult, perhaps infeasible, to determine private key 312 from the second public key 2103.

Device 1 may forward both first public keys 111, 211 to a cloaking element generator 30, which may output cloaking elements 301. The cloaking element generator 30 may use system data, which may be saved in memory 1001. Device 1 may forward first public key 111 to private key generator/inverter 31, which may output a pair 311 consisting of an element and its inverse, which may be the private key of device 1. The pair 311, the cloaking elements 301, and output from PRNG 10, may be forwarded to a concealed cloaking operator 32. In addition, a security level, which may be saved in memory 1001, may be forwarded to concealed cloaking operator 32. Concealed cloaking operator 32 may use system data, which may be saved in memory 1001. The output of concealed cloaking operator 32, 322 may be the second public key of device 1, and device 1 may send said second public key 322 to device 2 over link 3000. In some examples, it may be difficult, perhaps infeasible, to determine private key 311 from the second public key 322.

Device 2 may forward the received second public key 322, along with private key 312, to group element multiplier 33. The output from group element multiplier 33, 332 may be forwarded to KAP evaluator II 22. KAP evaluator II 22 may evaluate E-multiplication of 332 with an element using an E-multiplication module 40. The E-multiplication module 40 may use system data, which may be saved in memory 2002. KAP evaluator II 22 may use system data, which may be saved in memory 2002, to apply a hash function to the inverse of the output of the E-multiplication module 40. The output of the hash function applied to the inverse of the output of E-multiplication module 40 may be the shared secret data 50. In some examples, shared secret data 50 may be inaccessible to devices different form device 1 and device 2.

Device 1 may forward the received digital signature component of 2103 to a signature verifier 3303. If the output of the signature verifier 3303, 333 indicates that the digital signature has been verified, then device 1 may forward the second public key component of 2103, which consists of a pair of elements, and 311 to a group element multiplier 33, which may produce the element 331. The output from group element multiplier 33, 331 may be forwarded to KAP evaluator I 12. KAP evaluator I 12 may evaluate E-multiplication of 331 with an element using an E-multiplication module 40. The E-multiplication module 40 may use system data, which may be saved in memory 1001. KAP evaluator I 12 may use system data, which may be saved in memory 1001, to apply a hash function to the output of the E-multiplication module 40. The output of the hash function applied to the output of E-multiplication module 40 may be the shared secret data 50. In some examples, shared secret data 50 may be inaccessible to devices different form device 1 and device 2.

Figure 5:
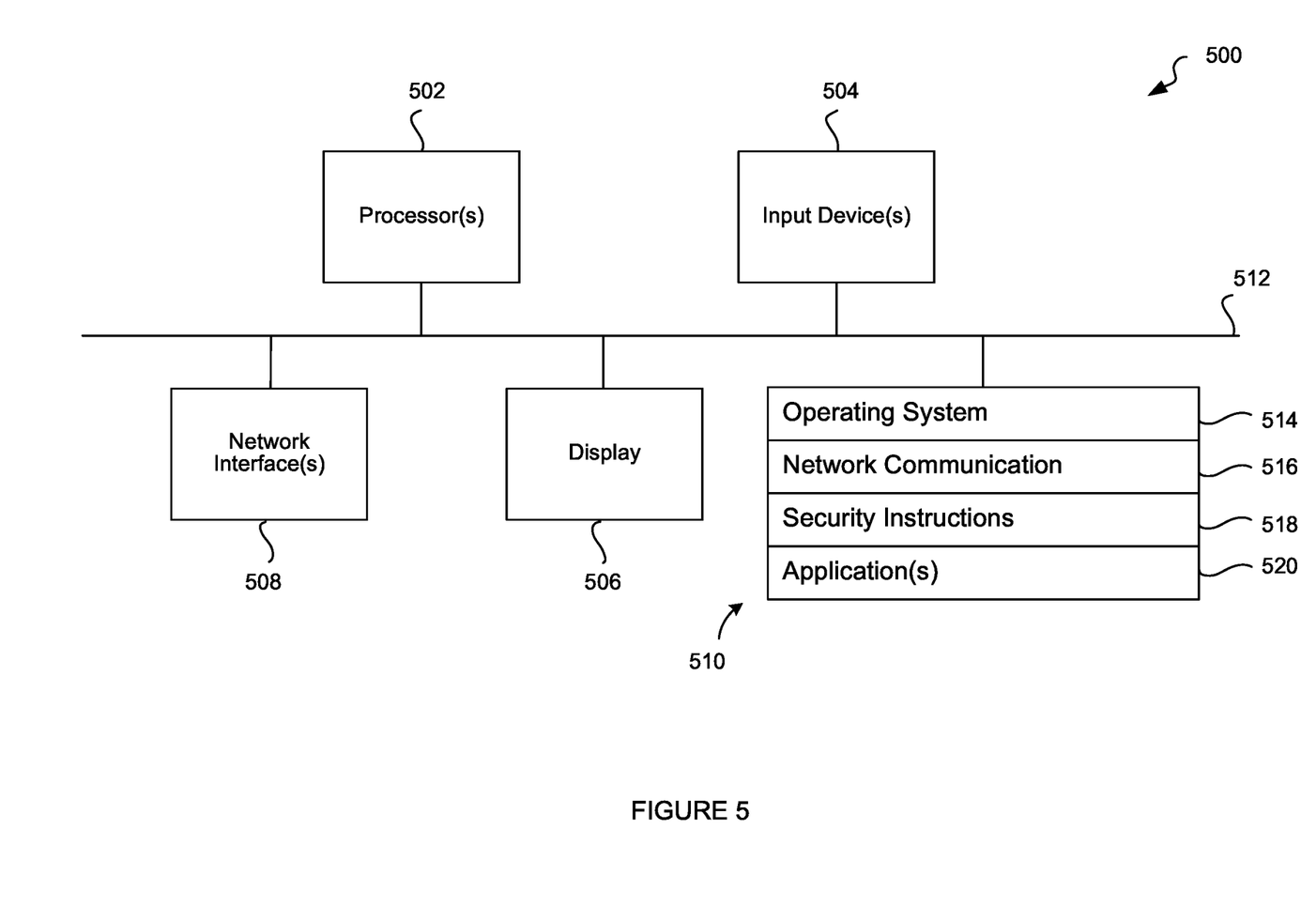
FIG. 5 illustrates an example computer system.

FIG. 5 shows a computing device 500 according to an embodiment of the disclosure. For example, computing device 500 may be configured to function as device 1 and/or device 2 as described above. The computing device 500 may be implemented on any electronic device that runs software applications derived from compiled instructions, including without limitation personal computers, servers, smart phones, media players, electronic tablets, game consoles, email devices, etc. In some implementations, the computing device 500 may include one or more processors 502, one or more input devices 504, one or more display devices 506, one or more network interfaces 508, and one or more computer-readable mediums 510. Each of these components may be coupled by bus 512, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad or display. Bus 512 may be any known internal or external bus technology, including but not limited to ISA, EISA, PCI, PCI Express, NuBus, USB, Serial ATA or FireWire. Computer-readable medium 510 may be any medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 510 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 may establish and maintain network connections (e.g., software for implementing communication protocols, such as TCP/IP, HTTP, Ethernet, telephony, etc.).

Security instructions 518 may include instructions for performing the processes related to shared secret generation and/or cloaking described above, for example one or more portions of the processes illustrated in FIGS. 1-4.

Application(s) 520 may be an application that uses or implements the processes described herein and/or other processes. The processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Some embodiments described above may allow two or more devices to communicate with each other over an open/insecure link to obtain a shared secret, for example by executing a sequence of various functions in one or more specific and precise ways. The precise sequence(s) may yield data that may be useful in cryptographic/security applications. In some embodiments, the devices may exchange data such as public keys over an open/insecure link while using the shared secret as data that may be used as input for cryptographic and security protocols, for example. Some embodiments may be used in tandem with digital signature algorithms and Hash functions such as those described in US Patent Application Publications No. 2017/0085387 and 2018/0097633 and U.S. Pat. No. 8,972,715, as well as the attached appendix, which are incorporated by reference herein in its entirety, in order to avoid some types of attacks that may be implemented on public key methods. As described in detail above, some underlying mathematical structures that may be used by some embodiments may be in abstract groups, e.g., the group element multiplier and the braid group.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for producing shared secret data shared by a first device and a second device, the method comprising:
   producing, by the second device, a private key of the second device and its inverse based on a first public key of the second device;
   producing, by the second device, a second public key of the second device based on the private key of the second device and a first public key of the first device;
   transmitting, by the second device, the second public key of the second device to the first device;
   producing, by the first device, a private key of the first device and its inverse based on the first public key of the first device;
   producing, by the first device, a second public key of the first device based on the private key of the first device and the first public key of the second device;

transmitting, by the first device, the second public key of the first device to the second device;

producing, by the first device, the shared secret data based on the private key of the first device and the second public key of the second device; and producing, by the second device, the shared secret data based on the private key of the second device and the second public key of the first device.

2. The method of claim 1, wherein producing the private key of the second device and its inverse comprises finding an inverse image of the first public key of the second device under a homomorphism from a group to a second group that contains the first public key of the second device and taking the inverse of said inverse image.

3. The method of claim 1, wherein producing the second public key of the second device comprises:

receiving or producing at least one cloaking element that stabilizes the first public key of the first device;

receiving a security level (SL) for the shared secret data; and inserting a plurality of additional cloaking elements within the private key of the second device at a plurality of pseudorandom points to produce the second public key of the second device so that any recovery process to recover the private key of the second device from the second public key of the second device requires at least $2^{SL}$ operations.

4. The method of claim 1, wherein producing the private key of the first device and its inverse comprises finding an inverse image of the first public key of the first device under a homomorphism from a group to a second group that contains the first public key of the first device and taking the inverse of said inverse image.

5. The method of claim 1, wherein producing the second public key of the first device comprises:

receiving or producing at least one cloaking element that stabilizes the first public key of the second device;

receiving a security level (SL) for the shared secret data; and inserting a plurality of additional cloaking elements within the private key of the first device at a plurality of pseudorandom points to produce the second public key of the first device so that any recovery process to recover the private key of the first device from the second public key of the first device requires at least $2^{SL}$ operations.

6. The method of claim 1, wherein producing the shared secret data based on the private key of the first device and the second public key of the second device comprises:

performing group element multiplication on the private key of the first device and the second public key of the second device to produce an output;

performing E-multiplication on the output, thereby obtaining an output of the E-multiplication including a first component; and applying a cryptographic hash function on the first component of the output of the E-multiplication.

7. The method of claim 1, wherein producing the shared secret data based on the private key of the second device and the second public key of the first device comprises:

performing group element multiplication on the private key of the second device and the second public key of the first device to produce an output;

performing E-multiplication on the output, thereby obtaining an output of the E-multiplication including a first component;

producing an inverse of the first component of the output of the E-multiplication; and applying a cryptographic hash function on the inverse of the first component of the output of the E-multiplication.

8. The method of claim 1, further comprising:

receiving, by the first device, the first public key of the second device from the second device;

producing, by the first device, the first public key of the first device based on the first public key of the second device; and transmitting, by the first device, the first public key of the first device to the second device.

9. The method of claim 8, wherein producing the first public key of the first device comprises selecting a member of a subgroup of elements that commute with the received first public key of the second device using an output of a pseudorandom number generator.

10. The method of claim 1, further comprising:

producing, by the second device, the first public key of the first device and the first public key of the second device; and transmitting, by the second device, the first public key of the first device and the first public key of the second device to the first device.

11. A device configured to share secret data with a second device, the device comprising:

a memory;

a transceiver; and a processor configured to:

produce or receive a first public key of the device and store the first public key of the device in the memory;

produce or receive a first public key of the second device and store the first public key of the second device in the memory;

produce a private key of the device and its inverse based on the first public key of the device and store the private key of the device and its inverse in the memory;

produce a second public key of the device based on the private key of the device and the first public key of the second device and store the second public key of the device in the memory;

transmit, by the transceiver, the second public key of the device to the second device;

receive, by the transceiver, a second public key of the second device from the second device and store the second public key of the second device in the memory, wherein the second public key of the second device is produced from a private key of the second device and the first public key of the device; and produce the shared secret data based on the private key of the device and the second public key of the second device.

12. The device of claim 11, wherein the processor is configured to produce the private key of the device and its inverse by performing processing comprising finding an inverse image of the first public key of the device under a homomorphism from a group to a second group that contains the first public key of the device and taking the inverse of said inverse image.

13. The device of claim 11, wherein the processor is configured to produce the second public key of the device by performing processing comprising:

receiving or producing at least one cloaking element that stabilizes the first public key of the second device;

receiving a security level (SL) for the shared secret data; and inserting a plurality of additional cloaking elements within the private key of the device at a plurality of pseudorandom points to produce the second public key of the device so that any recovery process to recover the private key of the device from the second public key of the device requires at least $2^{SL}$ operations.

14. The device of claim 11, wherein the processor is configured to produce the shared secret data based on the private key of the device and the second public key of the second device by performing processing comprising:

performing group element multiplication on the private key of the device and the second public key of the second device to produce an output;

performing E-multiplication on the output, thereby obtaining an output of the E-multiplication including a first component; and applying a cryptographic hash function on the first component of the output of the E-multiplication.

15. The device of claim 11, wherein the first public key of the second device is received from the second device and the first public key of the device is produced by the processor based on the first public key of the second device.

16. The device of claim 15, wherein the processor is further configured to transmit, by the transceiver, the first public key of the device to the second device.

17. The device of claim 15, wherein the processor is configured to produce the first public key of the device by performing processing comprising selecting a member of a subgroup of elements that commute with the received first public key of the second device using an output of a pseudorandom number generator.

18. The device of claim 11, wherein the first public key of the device and the first public key of the second device are produced by the processor.

19. The device of claim 11, wherein the processor is further configured to transmit, by the transceiver, the first public key of the device and the first public key of the second device to the second device.

20. A system comprising:
a first device configured to:
receive a first public key of a second device;
produce a first public key of the first device based on the first public key of the second device by performing processing comprising selecting a member of a subgroup of elements that commute with the received first public key of the second device using an output of a pseudorandom number generator; and
transmit the first public key to the second device; and
the second device configured to:
produce a private key of the second device and its inverse based on a first public key of the second device by performing processing comprising finding an inverse image of the first public key of the second device under a homomorphism from a group to a second group that contains the first public key of the second device and taking the inverse of said inverse image;
produce a second public key of the second device based on the private key of the second device and a first public key of the first device by performing processing comprising:
receiving or producing at least one cloaking element that stabilizes the first public key of the first device;

receiving a security level (SL) for the shared secret data; and
inserting a plurality of additional cloaking elements within the private key of the second device at a plurality of pseudorandom points to produce the second public key of the second device so that any recovery process to recover the private key of the second device from the second public key of the second device requires at least $2^{SL}$ operations;
transmit the second public key of the second device to the first device;
wherein the first device is further configured to:
produce a private key of the first device and its inverse based on the first public key of the first device by performing processing comprising finding an inverse image of the first public key of the first device under a homomorphism from a group to a second group that contains the first public key of the first device and taking the inverse of said inverse image;
produce a second public key of the first device based on the private key of the first device and the first public key of the second device by performing processing comprising:
receiving or producing at least one second cloaking element that stabilizes the first public key of the second device;
receiving a security level (SL) for the shared secret data; and
inserting a second plurality of additional cloaking elements within the private key of the first device at a plurality of pseudorandom points to produce the second public key of the first device so that any recovery process to recover the private key of the first device from the second public key of the first device requires at least $2^{SL}$ operations;
transmit the second public key of the first device to the second device; and
produce the shared secret data based on the private key of the first device and the second public key of the second device by performing processing comprising:
performing group element multiplication on the private key of the first device and the second public key of the second device to produce an output;
performing E-multiplication on the output, thereby obtaining an output of the E-multiplication including a first component; and
applying a cryptographic hash function on the first component of the output of the E-multiplication; and
wherein the second device is further configured to produce the shared secret data based on the private key of the second device and the second public key of the first device by performing processing comprising:
performing group element multiplication on the private key of the second device and the second public key of the first device to produce a second output;
performing a second E-multiplication on the second output, thereby obtaining an output of the second E-multiplication including a first component; and
producing an inverse of the first component of the output of the second E-multiplication; and
applying a cryptographic hash function on the inverse of the first component of the output of the second E-multiplication.

* * * * *